United States Patent Office 3,547,702
Patented Dec. 15, 1970

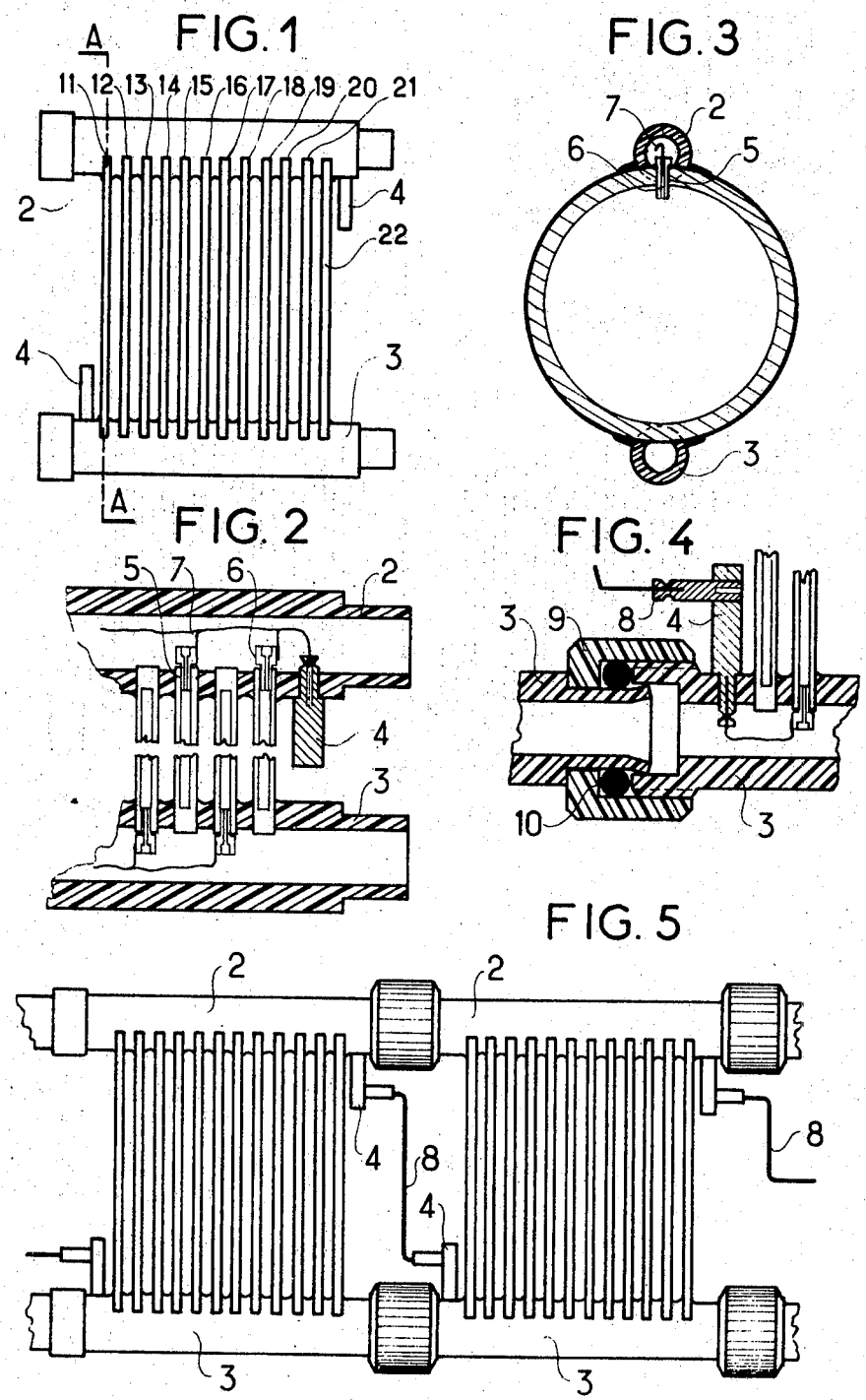

3,547,702
ELECTRODE ARRANGEMENT FOR A FUEL CELL
Claude Hespel, Limours, Essonne, France, assignor to Compagnie Generale d'Electricite, Paris, France
Filed May 12, 1967, Ser. No. 638,003
Claims priority, application France, May 12, 1966, 61,374
Int. Cl. H01m 27/00
U.S. Cl. 136—86          8 Claims

ABSTRACT OF THE DISCLOSURE

Fuel cell having a plurality of thin electrodes, similarly shaped and being either hollow or laterally spread and method of manufacture thereof.

---

The present invention relates to fuel cells having a plurality of thin electrodes, similarly shaped and being either hollow or laterally spread.

A particular aim of the invention is to provide a solution to the problems raised in assembling the said electrodes and ensuring the supply of gas to the electrodes, and the extraction of the electric current produced, in order to obtain a fuel cell of simple, compact and robust construction.

The invention envisages a fuel cell having a plurality of electrodes of similar shape, either hollow or laterally spread, arranged parallel to each other a fixed distance apart, in which the said electrodes, which have edge orifices for the entry or removal of gas, are held at least at the level of the orifices by a tubular element of plastic material, the axis of which is perpendicular to the mid plane of the electrodes, so that the orifices open out into the interior of the said tubular element, each electrode also having a device for ensuring the extraction of current.

In one embodiment of this invention, the orifices of the electrodes supplied with fuel are all displaced by the same angle with respect to the orifices of the electrodes supplied with the product for support of combustion, and the electrodes are held by the tubular elements respectively at the level of the orifices of the electrodes supplied with fuel and of the orifices or the electrodes supplied with the supporter of combustion.

The invention will now be described with reference to the accompanying drawings, which illustrate an exemplary embodiment of the present invention, and wherein:

FIG. 1 shows diagrammatically a front view of a cell of the invention;

FIG. 2 is a partial section in elevation of the cell shown in FIG. 1;

FIG. 3 is a section along the line A—A of the cell shown in FIG. 1;

FIG. 4 is a section in elevation at the level of attachment of two cells; and

FIG. 5 shows a front view of an assembly of two similar cells.

In FIG. 1, the reference numbers 11 to 21 designate thin, hollow metallic electrodes of similar shape, for instance circular shape, arranged parallel to each other and supported between two tubular elements 2 and 3 made of a suitable plastic material, the ends of which are machined to receive attachments thus enabling several of these tubular elements 2 and 3 to be joined end to end. Each tubular element 2 and 3 has a current collector 4 attached to and sealed through the wall thereof at one end, which current collectors in an assembly of cells will be in electrical connection, as will be seen below, with electrodes of the same polarity in adjoining cells.

Each hollow electrode has at least one peripheral orifice 5 for the supply and/or removal of reaction gas for the electrode concerned, the electrodes being arranged so that said orifices are positioned at opposite ends alternately in an arrangement of consecutive electrodes. The orifices open into the hollow interior of the tubular elements; accordingly, the hollow interior of the odd-numbered electrodes are in communication with the interior of tubular element 2, while the hollow interior of the even-numbered electrodes communicate with the interior of tubular element 3, the two tubular elements being diametrically opposed to each other, as indicated in FIG. 3.

If through each of the tubular elements, respectively, a fuel gas and a product for support of combustion is passed, all the electrodes bearing even numbers will be supplied with the same gas, which will be different from that supplied to all the electrodes bearing odd numbers. Each electrode communicates with the tubular element by way of a small metallic tip 6, made for example of nickel, inserted in the orifice formed in the circumferential edge of the electrode. The external diameter of the portion of the tip outside the electrode is slightly greater than that of the portion fitted into the said electrode providing a shoulder bearing against the outer surface of the electrode to control the depth of penetration of the tip in the orifice.

The extraction of electric current takes place by means of a metallic wire 7, for instance of silver, welded to the portion of the tip outside the electrode. The said tip furthermore prevents the orifice of the electrode from being closed by the plastic material during the assembly of the cell, which will be described below.

The wires attached to the tips inside each tubular element are twisted together along the axis of the latter and attached to the common terminal 4.

FIG. 3, which shows a section along the line A—A of FIG. 1, illustrates the completely gas-tight closure between plastic material and electrode, resulting from the method of manufacture, which will be described below.

The plastic material of which the tubular elements are made may be a polyamide, for example of the $C_{11}$ type, such as the substance known under the trademark "Rilsan." The electrodes can for example be of sintered nickel silver.

A plurality of cells similar to that shown in FIG. 1 may be joined together. For example, FIG. 5 shows diagrammatically a front view of such an assembly. Electrical connections 8 connecting the terminals 4 permit the cells to be joined in series or in parallel according to the wiring scheme desired; in the case of batteries of cells connected in series, precautions are taken to insulate the electrolytic compartments in which the cells dip so as to avoid an electrolysis phenomena. As has been stated, the ends of the tubular elements are machined to receive connections enabling several cells to be joined gas-tightly end to end.

FIG. 4 shows a section at the point of attachment of two cells. The tubular elements have been previously machined so that their ends that are to form a connection have a male portion and a female portion fitting into each other. The assembly takes place by means of a plastic socket 9, previously put in place on the female portion, with interposition of sealing ring 10 ensuring good sealing of the joint. The socket 9 is then screwed onto the male portion locking the joint. The end part of the female portion can be slightly widened, as shown, to improve the sealing effect.

In accordance with the invention, in order to produce a cell as described, one connects the electrodes to the plastic tubular elements by pressing the latter against the edge of the electrodes, which have been heated, so that the plastic material of which the tubular element is made melts at points in contact with the said electrodes and the electrodes are accordingly embedded in the plastic tubular element with a good seal formed therebetween.

In accordance with an embodiment of the invention, the electrodes provided with tips and wires for current pick-up are arranged parallel to each other at the required spacing which they must have by means of metallic combs equipped with heating elements, which combs are arranged so that the teeth of the said combs bear on the faces of the electrodes to the extent necessary to heat the electrodes. Then the tips with their current pick-up wires are engaged in suitable orifices in the tubular elements, and the tubular elements are brought into contact with the electrodes. The said tubular elements are thereupon subjected to radial pressure perpendicularly to their axis in such a way as to ensure the embedding of the electrodes in the said elements during the subsequent heating operation. In the case of elements made of polyamide $C_{11}$, this heating operation can consist in raising the temperature of the combs to approximately 250° C., the heat supplied to the electrodes being transmitted by them to the tubular element and the penetration of the electrodes into the latter takes place under the effect of the pressure. This operation is continued until the spacing of the tubular elements reaches the required distance; then cooling is allowed to take place, and the heating combs are removed, and wires are fixed to each terminal of the tubular elements.

Advantageously, the heating and cooling operations take place in an atmosphere of inert gas, for instance nitrogen, since in an oxidizing atmosphere the electrodes could deteriorate somewhat.

The heat penetration of the electrodes into the plastic tubular elements ensures a completely gas-tight connection between plastic tube and electrode, as well as remarkably good mechanical behavior, each electrode being double embedded in the case of the example shown.

The method of the invention makes possible advantageously the simultaneous assembly of a large number of electrodes.

It is also possible to produce cells having more than two tubular elements, for example four elements may be used, arranged at an angle of 90° to one another each electrode being in connection with the internal portions of two elements, one of the elements being used for supplying gas, the other for its removal. Cells can also be constructed having separate current output terminals for each electrode and without a common terminal for the electrodes of the same polarity.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. In a fuel cell, the improvement in combination therewith comprising an electrode arrangement comprising a plurality of thin hollow electrodes of similar shape, each provided in the peripheral edge thereof with at least one orifice for the supply and removal of gas, at least two tubular support elements, fabricated from synthetic resin material, supporting said electrodes in spaced parallel relationship with each electrode being disposed perpendicular to the axis of said elements and embedded, in a gas-tight manner, in the wall of said elements, each of said electrodes having an orifice communicating with the hollow interior of a support element such that the orifices of adjacent electrodes are in communication with the hollow interior of different support elements, thus forming two interdigitated groups each communicating with the hollow interior of a respective support element, and electric terminal means associated with each of said support elements for extraction of electric current from said cell.

2. The combination defined in claim 1 wherein said support elements are made from polyamide plastic material.

3. The combination defined in claim 1 in which the opposite ends of each tubular support element are provided with a male and a female portion, respectively, so as to effect gas-tight interconnection of adjacent cells.

4. The combination defined in claim 1 further including a hollow tubular tip inserted in the orifice of each electrode, each tip extending into the interior of a tubular support element.

5. In a fuel cell, the improvement in combination therewith comprising an electrode arrangement comprising a plurality of thin hollow electrodes of similar shape, each provided in the peripheral edge thereof with at least one orifice for the supply and removal of gas, at least two tubular support elements supporting said electrodes in spaced parallel relationship with each electrode being disposed perpendicular to the axis of said elements and having its orifice communicating with the hollow interior of one of said support elements, and electric terminal means associated with each of said support elements for extraction of electric current from said cell, further including a hollow tubular metal tip inserted in said orifice of each electrode, each of said tips extending into the interior of a tubular support element, wherein a current pick-up wire is attached to each metal tip and extends along the interior of said support members.

6. The combination defined in claim 5 wherein the current pick-up wires in each support element are connected together to the electric terminal means therein.

7. The combination defined in claim 1, wherein said electrodes are substantially disc-shaped and include a circumferential wall, said orifice being formed in the circumferential wall thereof.

8. The combination defined in claim 7 wherein said support elements are disposed parallel to one another and contact diametrically opposite points on each electrode.

References Cited

FOREIGN PATENTS

| 1,001,506 | 8/1965  | Great Britain | 136—86 |
| 1,101,603 | 1/1968  | Great Britain | 136—86 |
| 662,562   | 10/1965 | Belgium       | 136—86 |
| 657,320   | 4/1965  | Belgium       | 136—86 |
| 789,656   | 7/1968  | Canada        | 136—86 |

WINSTON A. DOUGLAS, Primary Examiner

M. J. ANDREWS, Assistant Examiner